United States Patent Office 3,743,661
Patented July 3, 1973

---

3,743,661
5,6-TRANS-25-HYDROXYCHOLECALCIFEROL
Hector F. De Luca, Michael F. Holick, and Michele Garabedian, Madison, Wis., assignors to Wisconsin Alumni Research Foundation, Madison, Wis.
No Drawing. Filed Feb. 14, 1972, Ser. No. 226,183
Int. Cl. C07c 171/10
U.S. Cl. 260—397.2           1 Claim

ABSTRACT OF THE DISCLOSURE 5,6-trans-25-hydroxycholecalciferol. The compound exhibits some antirachitic activity but is primarily characterized by its ability to stimulate intestinal calcium transport while having little if any ability to stimulate mobilization of calcium from bone in nephrectomized animals.

---

The invention described herein was made in the course of work under a grant or award from the Department of Health, Education, and Welfare.

This invention relates to a derivative of vitamin $D_3$.

More specifically this invention relates to an isomer of 25-hydroxycholecalciferol.

The character and activity of vitamin $D_2$ and vitamin $D_3$ are well documented and the 5,6-trans isomers of these vitamins have been identified, isolated and synthesized (see for example A. Verloop et al., Rec. Trav. Chim., 74, 1125 (1955) and H. H. Inhoffen et al., Chim. Ber., 90, 2544 (1957)).

In recent years derivatives of vitamins $D_3$ and $D_2$ which are more active than the D-vitamins themselves have been isolated, identified and synthesized. Among these is 25-hydroxycholecalciferol which exhibits greater antirachitic activity than vitamin $D_3$. (See U.S. Letters Patent No. 3,565,924, issued Feb. 23, 1971.)

The 5,6-trans isomer of 25-hydroxycholecalciferol has now been prepared and has been found to exhibit some unexpected biological properties as will be more apparent from the following description. Specifically, this compound is 9,10-seco - (5E,7E) - 5,7,10(19)-cholestatriene-$3\beta$,25-diol but will be referred to hereinafter as 5,6-trans-25-HCC.

5,6-trans-25-HCC was prepared as follows:

Ten mg. of 25-hydroxycholecalciferol (25 HCC) was dissolved in 10 ml. in a 9:1 admixture of Skellysolve B (a light petroleum fraction redistilled at 67–69° C.) and diethylether (v./v.). 50 $\mu$l. of a solution $I_2$ (0.1 mg./1 ml. Skellysolve B) was subsequently added. After 1 hr. at 25° C. the reaction was terminated wtih solid $Na_2S_2O_3$, washed with water and the product in the Skellysolve B/ether phase was dried over anhydrous $Na_2SO_4$. The solvent was evaporated under $N_2$ and the product was redissolved in 1 ml. of a 7:3 mixture Skellysolve B/diethylether (v./v.). The sample was applied to a 15 g. multibore silicic acid column measuring stepwise in diameter 1.2, 0.8 and 0.4 cm. The column was eluted with a hyperbolic gradient generated by having 230 ml. [7:3 Skellysolve B/diethylether (v./v.)] in a mixing chamber and 400 ml. [3:7 Skellysolve B/diethylether (v./v.)] in a holding chamber. Three-hundred ml. of diethylether was added to the holding chamber after it emptied.. One-hundred 5 ml. fractions were collected and the ultraviolet absorption spectra of each was taken to determine the elution position of the 5,6-trans-25-HCC.

The isomer was collected and chromatographed once again on the multibore silicic acid column.

The 25-hydroxycholecalciferol starting material in the above synthesis can be prepared as described by J. W. Blunt / H. F. DeLuca in Biochemistry 8, p. 671 (1969).

Structural identification of 5,6-trans-25-OH-cholecalciferol

The ultraviolet spectrum of the isomer showed the characteristic $\lambda_{max.}$ 273.5 nm. and a $\lambda_{min.}$ 232 nm. (6,7) for the 5,6-trans-triene system. The mass spectrum of the analog showed a molecular ion at m/e 400 similar to 25-HCC and fragments at m/e 271 and 253 (271-$H_2O$) characteristic for loss of side chain and at m/e 136 and 118 (136-$H_2O$) characteristic for the A ring plus $C_6$ and $C_7$. Gas-liquid chromatography (GLC) of the 5,6-trans-25-HCC showed only one component which is consistent with a previous report for 5,6-trans-vitamin $D_3$ (A. Verloop et al., Rec. Trav. Chim., 78, 1004 (1959)). The GLC chromatogram also demonstrates the absence of 25-HCC which normally has a shorter retention time and appears as two peaks due to thermal cyclization to the pyro and isopyro forms of the vitamin.

BIOLOGICAL ACTIVITY

Antirachitic activity

Antirachitic activity of 5,6-trans-25-HCC was measured by the standard line test assay as described in U.S. Pharmacopoeia, 15th Revision (Mack Publishing Co., Easton, Pa. 1955), p. 889. The following results, which represent the average values from eight animals in each case, were obtained.

Table 1

| Compound: | Antirachitic activity (IU/$\mu$g.) |
|---|---|
| Vitamin $D_3$ | 45±5 |
| 5,6-trans-25-HCC | 4±1 |

Intestinal calcium transport

For intestinal calcium transport measurements, weanling male albino rats, obtained from the Holtzman Co., Madison, Wis., were housed individually in hanging wire cages and given food and water ad libitum. They were fed for three weeks the low calcium purified diet described by Suda et al. (J. Nutr. 100, 1049 (1970)). The rats became severely vitamin D-deficient as revealed by a serum calcium concentration of 4–5 mg./100 ml. At this time the rats were divided into five groups. One group received only the ethanol vehicle. Two other groups (either sham operated, i.e. incised to induce like trauma but without kidney removal or bilaterally nephrectomized) received either 25 $\mu$g. of 5,6-trans-25-HCC or 25 $\mu$g. of 25-HCC dissolved in the ethanol. All doses were administered intrajugularly in 0.05 ml. 95% EtOH. Sixteen hours later the rats were decapitated. The small intestines were removed for the measurement of intestinal calcium transport by the everted gut sac technique described by Martin and DeLuca (Am. J. Physiology 216, 1351 (1969). The proximal 5.5 cm. of the duodenum was used in the test.

The results obtained are shown in the table below.

TABLE 2

| Dose | Condition of animal | 45 Ca Serosal[1] / 45 Ca Mucosal |
|---|---|---|
| Control | Normal | [1] 1.8±0.2(5) |
| 25 μg. 5,6-trans-25-HCC | Sham operated | [2] 4.4±0.3 |
| Do | Bilaterally nephrectomized | 3.3±0.3(6) |
| 25 μg. 25-HCC | do | 1.9±0.3(5) |
| Do | Sham operated | 4.5±0.8(5) |

[1] Plus or minus the standard error of the mean. Numbers in parentheses show the number of animals in each group.
[2] Percent.

Calcium mobilization from bone

For the measurement of calcium mobilization from bone, male weanling Holtzman rats were fed the adequate calcium and phosphorus, vitamin D-deficient diet described in Am. J. Physiology, 204, p. 838, Guroff et al. (1963) for two weeks and then the low calcium (0.02%) vitamin D-deficient diet of Suda et al. (supra) for another 10 days. Groups of rats were bilaterally nephrectomized and were injected immediately after surgery with either 25 μg. 5,6-trans-25-HCC or 0.25 μg. 25-HCC dissolved in 50 μl. of 95% ethanol. Controls received 50 μl. of 95% ethanol vehicle. Twenty-four hours after the administration of the dose, the animals were killed by decapitation and the blood serum was collected.

Serum calcium determinations were made with an atomic absorption spectrophotometer (Perkin-Elmer Model #214). For this, serum samples (0.10 ml.) were diluted with 1.9 ml. of 0.1% $LaCl_3$.

Results are shown below.

TABLE 3

| Dose | | Serum $Ca^{++}$ |
|---|---|---|
| Control | | [1] 4.3±0.1(6) |
| 25 μg. 5,6-trans-25-HCC | Bilaterally nephrectomized | 4.9±0.1(6) |
| 0.25 μg. 25-HCC | do | 4.5±0.1(6) |

[1] Plus or minus the standard error of the mean. The numbers in parentheses show the number of rats in each group.

Table 3 clearly demonstrates that the 5,6-trans-25-HCC like 25-HCC itself has little or no activity in eliciting a rise in serum calcium at the expense of bone in nephrectomized rats.

Although it is evident from the foregoing data that 5,6-trans-25-HCC is only about one-tenth as active as vitamin $D_3$ in the cure of rickets it exhibits the unusual properties of being able to stimulate intestinal calcium transport in bilaterally nephrectomized rats while having little or no activity in stimulating the mobilization of calcium from bone. This suggests the application of 5,6-trans-25-HCC in the treatment of bone disease associated with chromic renal failure.

Having thus described the invention what is claimed is:
1. 5,6-trans-25-hydroxycholecalciferol.

References Cited
UNITED STATES PATENTS

| | | | |
|---|---|---|---|
| 3,585,221 | 6/1971 | DeLuca et al. | 260—397.2 |
| 3,565,924 | 2/1971 | DeLuca et al. | 260—397.2 |

ELBERT L. ROBERTS, Primary Examiner